(12) United States Patent
Barrellon et al.

(10) Patent No.: US 11,152,180 B2
(45) Date of Patent: Oct. 19, 2021

(54) FUSE BOX, FUSE BOX ASSEMBLY COMPRISING SUCH FUSE BOX AND VEHICLE

(71) Applicant: VOLVO TRUCK CORPORATION, Gothenburg (SE)

(72) Inventors: Rémi Barrellon, Simandres (FR); Christophe Hybord, Chassieu (FR)

(73) Assignee: VOLVO TRUCK CORPORATION, Gothenburg (SE)

(*) Notice: Subject to any disclaimer, the term of this patent is extended or adjusted under 35 U.S.C. 154(b) by 0 days.

(21) Appl. No.: 16/755,458

(22) PCT Filed: Oct. 19, 2017

(86) PCT No.: PCT/IB2017/001453
§ 371 (c)(1),
(2) Date: Apr. 10, 2020

(87) PCT Pub. No.: WO2019/077383
PCT Pub. Date: Apr. 25, 2019

(65) Prior Publication Data
US 2020/0243293 A1  Jul. 30, 2020

(51) Int. Cl.
*H01H 85/045*  (2006.01)
*H01H 85/20*  (2006.01)

(52) U.S. Cl.
CPC ... *H01H 85/0452* (2013.01); *H01H 2085/209* (2013.01); *H02J 2310/46* (2020.01)

(58) Field of Classification Search
CPC ......... H01H 85/0452; H01H 2085/209; H01H 2085/0034; H01H 2085/025;
(Continued)

(56) References Cited

U.S. PATENT DOCUMENTS 5,357,184 A    10/1994  McGowan et al.
6,294,978 B1 *  9/2001  Endo ............... H01H 85/044
                                                337/159
(Continued)

FOREIGN PATENT DOCUMENTS

DE    29520691 U1    7/1996
DE    19963268 A1    6/2001
(Continued)

OTHER PUBLICATIONS

Torcheux, Bertrand, "Assembly of modules for fuse housings", Apr. 11, 2001, Sylea SOC, Entire Document (Translation of EP 1091380) (of record, cited in the IDS, including the Original Copy) (Year: 2001).*

(Continued)

*Primary Examiner* — Stephen S Sul
(74) *Attorney, Agent, or Firm* — Venable LLP; Jeffri A. Kaminski

(57) ABSTRACT

The invention concerns a fuse box, comprising a busbar (6) and at least one fuse (8) connected to the busbar, each fuse including two opposite end portions (8A, 8B) and a central portion (82), at least the central portion of each fuse and a section of the busbar being encapsulated in a plastic coating layer. The central portion (82) includes a part (84) of reduced cross-section. The two end portions (8A, 8B) include two respective electrical connectors (81A, 81B), and at least the two electrical connectors (81A, 81B) of each fuse (8) are not encapsulated in the plastic coating layer, so that a new fuse (12) can be connected between the two electrical connectors (81A, 81B) in replacement of a blown fuse (8).

22 Claims, 10 Drawing Sheets

(58) Field of Classification Search
CPC ..... H01H 2085/0555; H01H 2085/206; H01H 2085/266; H01H 85/10; H01H 85/044; H02J 2310/46
See application file for complete search history.

(56) References Cited

U.S. PATENT DOCUMENTS

| | | | | |
|---|---|---|---|---|
| 6,878,004 B2* | 4/2005 | Oh | .................... | H01H 85/2035 439/250 |
| 6,902,434 B2* | 6/2005 | Stack | .................. | H01M 50/572 439/620.28 |
| 8,269,596 B2* | 9/2012 | Staylor | .............. | H01H 85/2045 337/229 |
| 9,754,754 B2* | 9/2017 | Kawase | ................... | H01H 1/58 |
| 2004/0137792 A1* | 7/2004 | Matsumura | .......... | H01H 85/044 439/630 |
| 2010/0060407 A1* | 3/2010 | Iwata | .................. | H01H 85/143 337/227 |
| 2010/0328018 A1 | 12/2010 | Matsumoto | | |
| 2012/0064771 A1* | 3/2012 | Urrea | .................. | H01H 85/205 439/620.29 |
| 2013/0095696 A1* | 4/2013 | Matsumura | .......... | H01H 85/044 439/620.26 |
| 2013/0126204 A1* | 5/2013 | Nohara | ................ | H01H 85/044 174/50 |
| 2014/0306795 A1* | 10/2014 | Kato | ...................... | H01H 69/02 337/401 |
| 2015/0179379 A1* | 6/2015 | Nohara | .................. | H01H 71/16 337/68 |
| 2018/0019085 A1* | 1/2018 | Kawase | ................. | H01H 85/20 |

FOREIGN PATENT DOCUMENTS

| | | |
|---|---|---|
| EP | 0966015 A1 | 12/1999 |
| EP | 1075012 A2 | 2/2001 |
| EP | 1091380 A1 | 4/2001 |
| GB | 2195064 A | 3/1988 |
| KR | 20160148932 A | 12/2016 |
| WO | 98/24107 A1 | 6/1998 |

OTHER PUBLICATIONS

Betti, Bruno; Hoffer, Guido; Sanwald, Guenther, "Fuse strip, in particular, for fuse boxes of motor vehicles comprises contact pairs which are formed as respective opposing extensions of the integral fuse zone", Jun. 28, 2001, Entire Document (Translation of DE 19963268) (of record, cited in IDS) (Year: 2001).*
International Search Report and Written Opinion dated Dec. 14, 2018 in corresponding International PCT Application No. PCT/IB2017/001453, 11 pages.

* cited by examiner

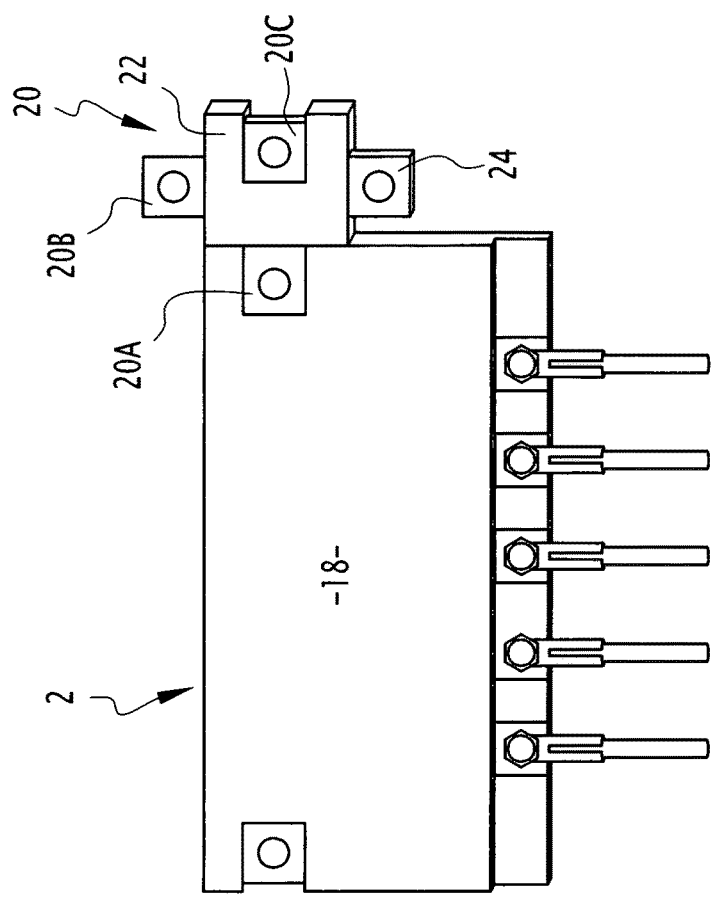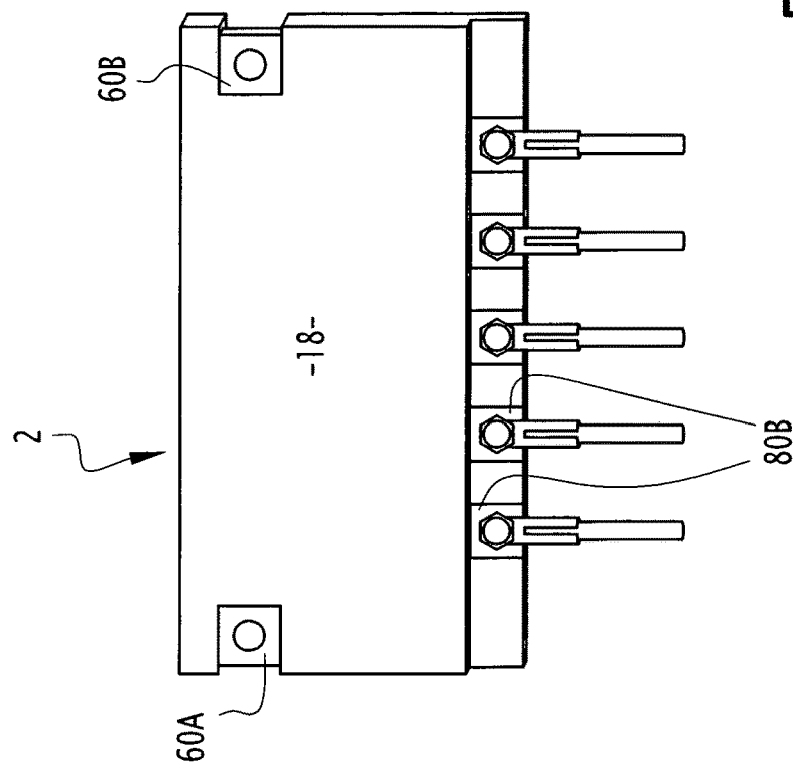
FIG.5

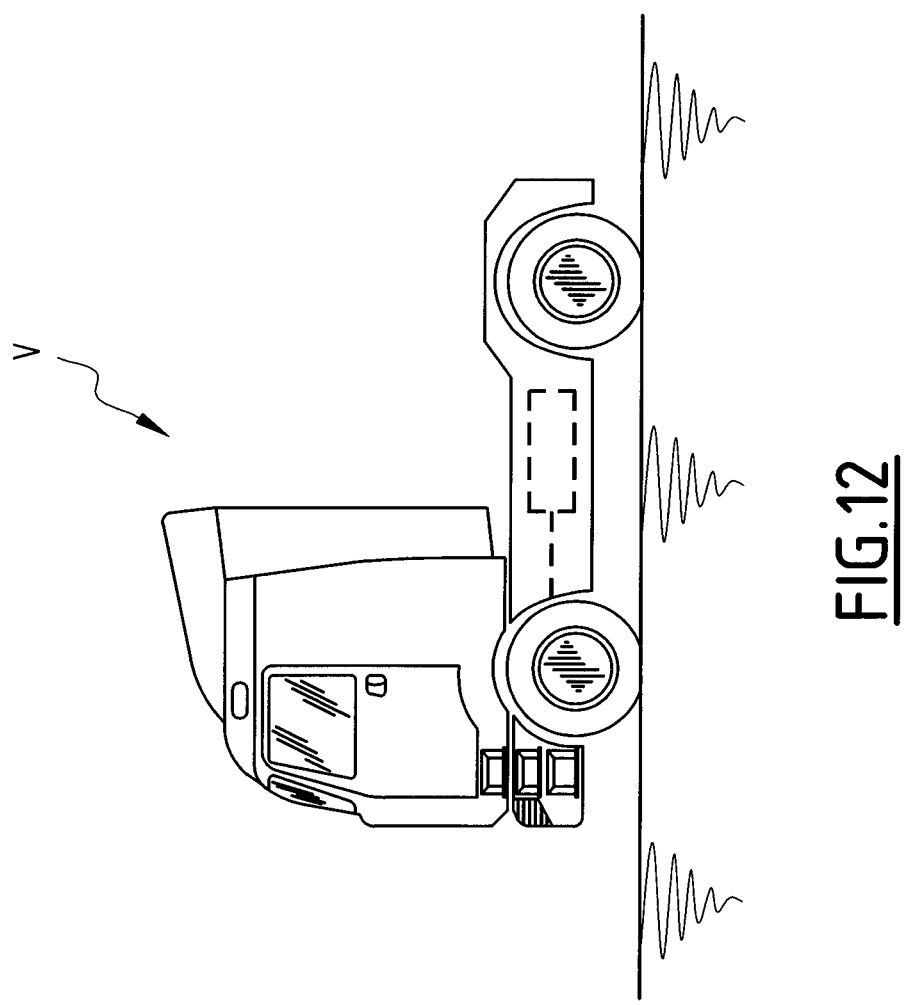

FUSE BOX, FUSE BOX ASSEMBLY COMPRISING SUCH FUSE BOX AND VEHICLE

CROSS-REFERENCE TO RELATED APPLICATIONS

This application is a U.S. National Stage application of PCT/IB2017/001453, filed Oct. 19, 2017 and published on Apr. 25, 2019 as WO 2019/077383 A1, all of which is hereby incorporated by reference in its entirety.

TECHNICAL FIELD

The present invention concerns a fuse box. In particular, the invention relates to a fuse box to protect the wiring and electrical equipment of a vehicle, such as a truck.

BACKGROUND OF THE INVENTION

Today, the vehicles electrical architectures and safety require more and more fuse protection. Typically a fuse box distributes fuse protected power supplies from one original unprotected supply. The fuse box includes at least one busbar connected to the unprotected power supply and fuses that are connected to the busbar and that form the fuse protected power supplies. The fuse type we are preferably considering here are the ones called SF30 and SF51 types from ISO 8820, which are both screwed fuses.

EP 1 075 012 discloses a fuse device wherein at least one busbar circuit is integrally formed with a fuse circuit. The fuse circuits are formed by blowout portions that are designed in accordance with the capacities of the electrical load. In particular, the narrower portion of each blowout portion is blown out before an overcurrent or an overvoltage is applied. The fuse device is housed in a case formed from an electrically insulating material.

U.S. Pat. No. 5,357,184 discloses a fuse system for a battery charger, comprising a busbar and fuse links. The fuse links are fastened to a nonconductive structural support and are positioned behind a transparent cover. This protects the user from embers which may be caused by melting of the fuse links and enables the user to visually determine the physical condition of each of the fuse links.

WO 98/24107 discloses a voltage distribution device, for use especially in motor vehicles. This device includes fuses, comprising each a fuse body that includes a central portion with a reduced cross-section.

US 2010/0328018 A1 discloses a fusable link unit comprising a fuse busbar which is made of a metallic plate and a housing which is formed through injection molding by use of an insulating synthetic resin material The housing has a substantially rectangular parallelepiped shape and includes a housing main body which is opened upwards. The busbar and fuses are not overmoulded with plastic material.

EP 0 966 015 A1, which may be considered as the closest prior art document, discloses a busbar-fuselink element, comprising a metal plate provided with bus bars from which emerge branches. The metal plate is covered with a sheath formed by an overmoulded layer. The branches form a fuse-link zone. In particular, the fuselink zones are formed with an upper fusible portion and a lower portion with contact or male element characteristics.

Therefore, manufacturing the busbar and the fuses in one-piece is known from prior art and helps reducing manufacturing costs. However, when one of the fuses blows, it cannot be replaced and the whole fuse box must be changed.

The aim of the present invention is to propose a fuse box that remedies the abovementioned drawbacks.

SUMMARY OF THE INVENTION

To this end, the invention concerns a fuse box, comprising a busbar and at least one fuse connected to the busbar, each fuse including two opposite end portions and a central portion, at least the central portion of each fuse and a section of the busbar being encapsulated in a plastic coating layer. According to the invention, the central portion includes a part of reduced cross-section. Further, the two end portions include two respective electrical connectors and at least the two electrical connectors of each fuse are not encapsulated in the plastic coating layer.

Thanks to the invention, when one fuse is blown, the internal damaged fuse is kept inside the plastic material. The bus bar never needs to be changed when one of the fuses blows-up. It remains inside the fuse box, but each fuse can be individually changed. Above the dead fuse, a standard ISO 8820 fuse can simply be added on the available fixations. The maintenance is simple and cost effective. There is a gain of time and money. In addition, the fuse box dimensions and weight are optimized since the busbar, the fuse(s) and the plastic overmoulded layer are created as a unique part. This enables saving a lot of time during fuse box creation (less assembly).

According to further advantageous features of the fuse box according to the invention, taken in isolation or in combination:

- Said at least two electrical connectors are two connecting pins that extend in parallel to each other.
- The busbar and each fuse are manufactured from a single sheet of conductive material, in particular from a steel sheet.
- The parallel connecting pins of each fuse extend in a direction that is perpendicular to a surface of the sheet of conductive material.
- The plastic coating layer includes a recess for receiving a new fuse above a blown fuse.
- The opposite end portions of each fuse include coplanar conductive plates and the central portion is offset from a geometric plane extending between the conductive plates of the fuse.
- The fuse box includes several fuses.
- Alternatively, the fuse box includes only one fuse.
- Each fuse extends perpendicular from the busbar.
- The fuse box comprises only one busbar.
- The busbar includes at least one, preferably two connecting portions.
- The busbar includes three connecting portions.
- Each connecting portion includes a connecting pin or a connecting hole.
- Each connecting portion is not encapsulated in the plastic coating layer.
- Each connecting pin fully protrudes from the plastic coating layer.
- The opposite end portions of each fuse include two respective parallel conductive plates, the parallel connecting pins extending from the conductive plates in a direction that is perpendicular to the conductive plates, the conductive plates being encapsulated in the plastic coating layer. The parallel connecting pins are not encapsulated in the plastic coating layer.

The opposite end portions of each fuse are not encapsulated in the plastic coating layer.

The plastic coating layer is a plastic overmoulded layer.

The fuse box is a fuse box module of a fuse box assembly and includes at least one means for fitting another fuse box module.

The invention also concerns a fuse box assembly, comprising at least two fuse box modules to be fitted together, wherein at least one of the fuse box modules is according to the one previously defined.

Preferably, the union between the fuse box modules is obtained by a male-female fitting.

The invention also concerns a vehicle, comprising a fuse box or a fuse box assembly as previously defined.

The invention also concerns a fuse box assembly comprising at least two fuse box modules to be fitted together. At least one of the fuse box modules is as defined here-above.

Preferably, the union between the fuse box modules is obtained by a male-female fitting.

The invention also concerns a vehicle comprising a fuse box or a fuse box module as described above.

BRIEF DESCRIPTION OF THE DRAWINGS

The invention will be better understood from reading the following description, given solely by way of three non-limiting examples and with reference to the appended drawings, which are schematic depictions, in which:

FIG. 5 includes two schemes representing an assembly of two fuse box modules, both fuse box modules being fuse boxes according to first embodiment of the invention;

FIG. 12 represents a vehicle, in particular a truck, comprising a fuse box according to the invention.

DETAILED DESCRIPTION OF EXAMPLE EMBODIMENTS OF THE INVENTION

Figure 1:
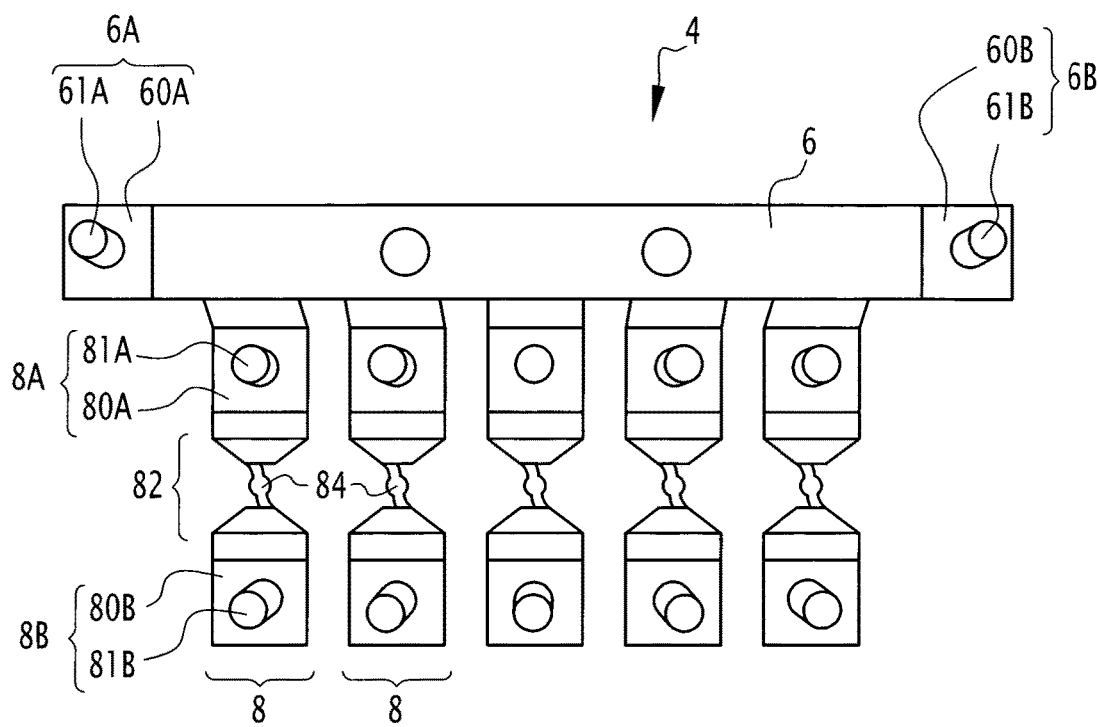
FIG. 1 is a top view representing a conductive part of a first embodiment of a fuse box according to the invention, such conductive part including a busbar and fuses connected to the busbar.
Figure 2:
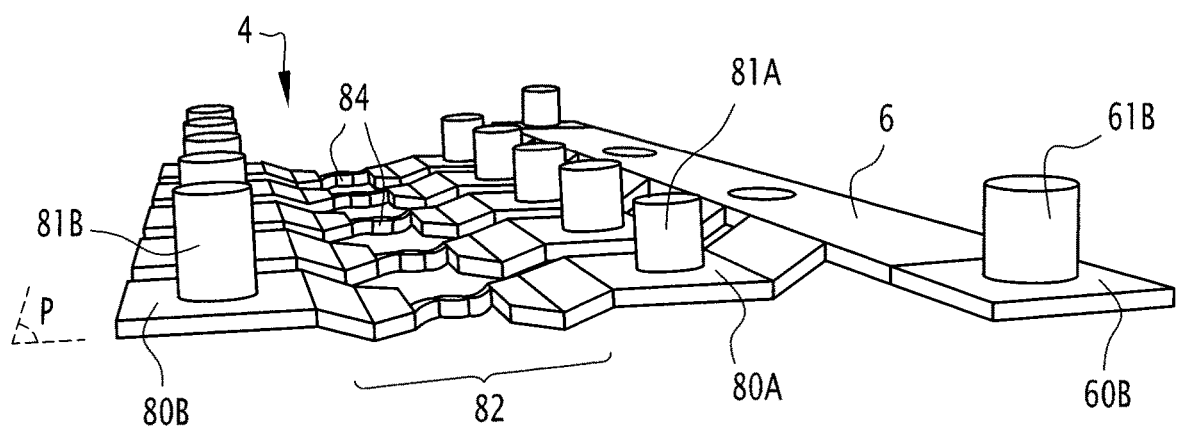
FIG. 2 is a perspective view of the conductive part of FIG. 1.

FIGS. 1 and 2 represent a conductive part 4 of a fuse box 2 according to a first embodiment of the invention. Typically, the fuse box 2 may be used in the automotive industry to protect the wiring and electrical equipment of a vehicle. FIG. 12 shows an example of a vehicle V, in particular a truck, comprising a fuse box 2 according to the invention.

Advantageously, the fuse box 2 includes fixing means (not represented) for fixing the fuse box 2 on the vehicle V.

The conductive part 4 comprises a busbar 6 (or "bus bar") and at least one, preferably several fuses 8, connected to the busbar 6. The fuses 8 can be, for instance, SF30 and SF51 type fuses from ISO 8820, i.e. screwed fuses. In the example, each fuse 8 extends perpendicular from the busbar 6.

Typically, the busbar 6 is a straight metallic strip. Preferably, the busbar 6 and each fuse 8 are manufactured from a single sheet of conductive material, in particular from a steel sheet. Accordingly, the busbar 6 and the fuses 8 are manufactured in the same time, by successively cutting and bending a single sheet of conductive material.

The busbar 6 includes at least one, preferably two connecting portion 6A and 6B that can be arranged at the extremities of the busbar. Preferably, the two connecting portions 6A and 6B are arranged at the opposite longitudinal ends of the busbar 6. In the example, the connecting portions 6A and 6B include two respective conductive plates 60A and 60B and two respective connectors 61A and 61B. Connectors 61A and 61B can be male or female connectors and may have the shapes of rods, stubs, bolts, holes, etc. In the example hereafter and as represented on FIGS. 1, 2 and 3, the connectors are connecting rods 61A and 61B that extend perpendicular from the conductive plates 60A and 60B. The two connecting portions 6A and 6B can be therefore identified, in the present example, as male electrical connectors. One of the connecting portions 6A and 6B corresponds to an electrical input of the fuse box 2, while the other connecting portion corresponds to an electrical output of the fuse box 2. This output is not fuse protected since it is not a fused output, i.e. an output protected by a fuse. Therefore, electrical power is always available at this output, regardless of the intensity of the current flowing through the busbar 6.

Each fuse 8 includes two opposite end portions 8A and 8B and a central portion 82 extending between the end portions 8A and 8B. The end portion 8A is arranged nearby the busbar 6, between the busbar 6 and the end portion 8B. The central portion 82 includes a part 84 of reduced cross-section that is designed to melt at a specific temperature, thus allowing the two end portions 8A and 8B to separate. In such configuration, no current can flow through the fuse and one says that the fuse is blown.

The two end portions 8A and 8B include two respective electrical connectors 81A and 81B. In a preferred embodiment, these two electrical connectors 81A and 81B are two connecting pins 81A and 81B that extend in parallel to each other. The opposite end portions 8A and 8B of each fuse 8 also include two respective conductive plates 80A and 80B. In a preferred construction, the respective conductive plates 80A and 80B support the two connecting pins 81A and 81B. Alternatively, the electrical connectors 81A and 81B may be different from connecting pins. For instance, the electrical connectors 81A and 81B may be holes formed respectively in the two conductive plates 80A and 80B. Depending on their construction, the end portions 8A and 8B can be identified as two female electrical connectors (holes) or as two male electrical connectors (connecting pins 81A and 81B). Obviously, one may also envisage a combination of one female connector with one male connector.

In the preferred embodiment, the parallel pins 81A and 81B of each fuse 8 extend preferably in a direction that is perpendicular to the conductive plates 80A and 80B i.e. that is perpendicular to the surface of the sheet of conductive material. The parallel pins 81A and 81B of each fuse 8 extend in the same direction from the conductive plates 80A and 80B. Typically, the parallel pins 81A and 81B have a circular cross-section.

Figure 3:
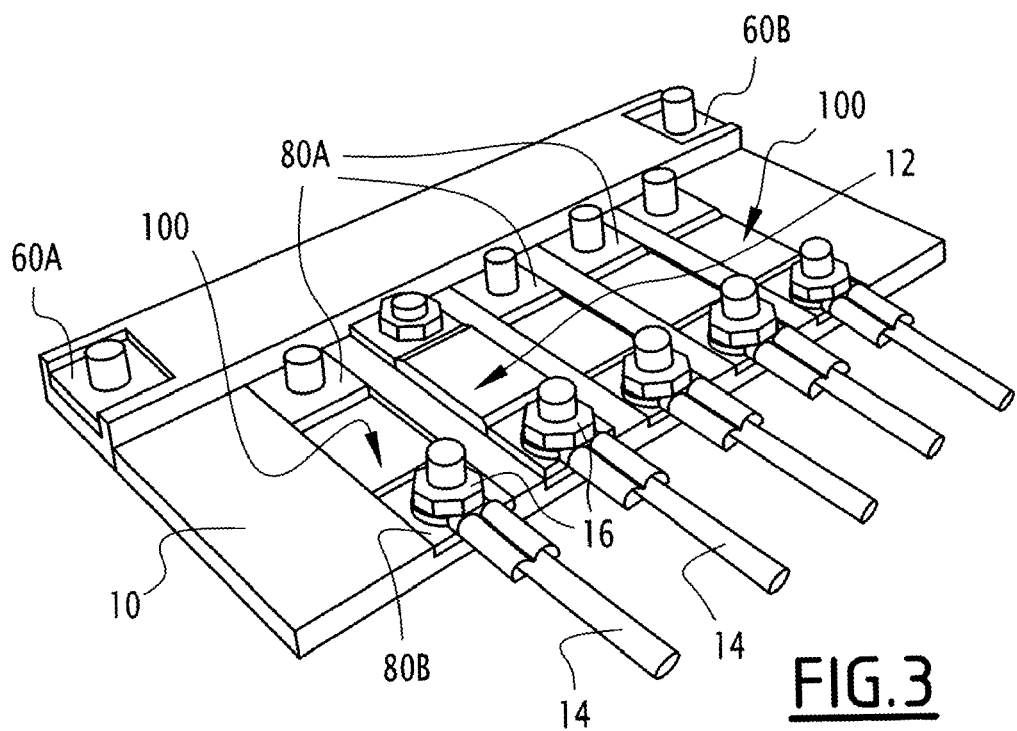
FIG. 3 is a perspective view of the fuse box according to the invention (first embodiment), comprising the conductive part of FIGS. 1 and 2 and a plastic overmoulded layer.
Figure 4:
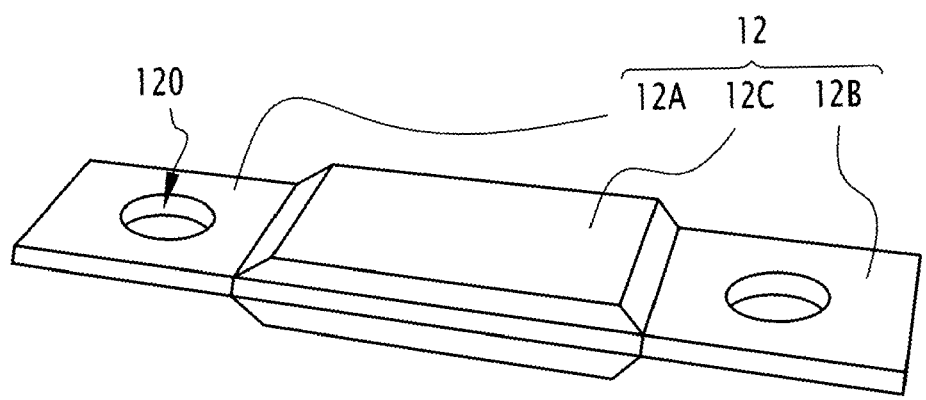
FIG. 4 is a perspective view of a traditional fuse that can be used to replace a blown fuse of the fuse box.

As shown on FIG. 3, each connecting pin 81B enables connecting an electrical cable 14, in particular with a nut connection. Accordingly, in a preferred embodiment, each connecting pin 81A is threaded in order to receive a clamping nut 16. The clamping nuts 16 allow maintaining the electrical cables 14 in contact with the corresponding conductive plates 80B. The ends 8B of the fuses 8 form fused outputs of the fuse box 2, meaning that electrical power is available at the ends 80B only if the intensity of the current flowing through the fuses is below the breaking capacity of the fuses 8. If such is not the case, then the fuse(s) blow(s) and no electrical current can be distributed to the corresponding electrical cable(s) 14.

In the example, the conductive plates 80A and 80B are coplanar, meaning that there is a geometric plane P extending between the conductive plates 80A and 80B. Advantageously, the central portion 82 of each fuse 8 is offset from the geometric plane P.

At least the central portion 82 of each fuse 8 and a section of the busbar 6 are encapsulated in a plastic coating layer 10. Preferably, the plastic coating layer 10 is a plastic overmoulded layer. In other words, the plastic coating layer is formed by plastic material that is overmoulded on at least the central portion 82 and the section of the busbar 6. The plastic overmoulded layer 10 (or plastic coating layer) allows protecting the conductive elements from corrosion, electrical shortcut, etc. More precisely, plastic injected material is used to protect fuse elements 8 (blow-up area protection and insulation), maintain busbar 6 and fuses 8 together, isolate (electrical) and protect (mechanical) the complete fuse box 2, and support a vehicle fixation device (not represented).

Alternatively, the plastic coating layer 10 can also be formed by using a 3D printing technology also known as an additive manufacturing technology.

In particular, and as shown on FIG. 3, the plastic overmoulded layer 10 encapsulates the section of the busbar 6 between the two connecting portions 6A and 6B. The encapsulation (protection) of the fuse(s) is directly made during plastic injection. The plastic material creates, around fuse element areas, a "blow up area protection" of the fuse and its insulation too. Indeed, fuses need a protection around the main hot point where the fuse will blow up. This area can be designed in different ways. Either the plastic material plays a role in the blow-up action, and in this case, fuse design is adapted to the plastic material specifications or a "free area" is created around the hot point. This free area allows keeping some air around the main hot point and fuse specifications remain independent from the plastic material itself. Preferably, the busbar 6 includes holes that are filled with plastic material after the step of plastic overmoulding and that then enhance mechanical strength and grip of the plastic overmoulded layer 10 on the conductive part 4.

The two electrical connectors 81A and 81B of each fuse 8, which are formed, in the preferred embodiment, by the two parallel pins 81A and 81B, are however not encapsulated in the plastic overmoulded layer 10. The term "encapsulated" means that the two electrical connectors 81A and 81B and preferably the two parallel pins 81A and 81B of each fuse 8 are accessible from the outside (discernible by touch) since they protrude from the plastic overmoulded layer 10. Accordingly, when one fuse 8 is blown, it is possible to connect a new fuse 12 in replacement of the blown fuse. This configuration is represented on FIG. 3 for the full understanding. As shown on this figure, the new fuse 12 is connected between the two electrical connectors 81A and 81B and preferably the two connecting pins 81A and 81B of the blown fuse, which is the second fuse starting from the left.

Accordingly, the blown fuse is not removed, i.e. remain encapsulated in the plastic overmoulded layer 10, and the busbar 6 is not changed. Finally, as the busbar 6 will never be changed, maintenance is simple and cost effective.

Preferably, the new fuse 12 is a standard ISO 8820 fuse (standard standalone bought fuse) comprising two opposite ends 12A and 12B and a central body 12C extending between the two ends 12A and 12B. The two ends 12A and 12B are conductive pads of typically rectangular shape, which delimit respectively two circular holes 120 for the passage of the connecting pins 81A and 81B or screws. Given their construction, the two ends 12A and 12B of fuse 12 can be identified as female electrical connectors.

Preferably, the two conductive plates 80A and 80B of each fuse 8 are also not encapsulated in the plastic overmoulded layer 10. Alternatively, the two conductive plates 80A and 80B of each fuse 8 could be encapsulated in the plastic overmoulded layer 10. Advantageously, each one of the connecting portions 6A and 6B is not encapsulated in the plastic overmoulded layer 10. Busbar 6 and fuses 8 are maintained in the mold during plastic material injection. Raw material injection and its associated mold are designed so that the power contacts 8A, 8B, 6A and 6B remain free and not insulated, allowing power electrical connections.

The plastic overmoulded layer 10 preferably includes a recess 100 for receiving the new fuse 12 above the blown fuse 8. In particular, the recess 100 has a shape complementary to that of the central body 12C of the new fuse 12. Then, in the preferred embodiment where both conductive plates 80A and 80B of each fuse 8 are not encapsulated in the plastic overmoulded layer 10, when the new fuse 12, and in particular the central body 12*c* of the new fuse 12, is received in the recess 100, the conductive pads 12A and 12B of fuse 12 are in direct contact with the conductive plates 80A and 80B of the blown fuse 8. Accordingly, there is no need for additional conductive spacers between the conductive pads 12A and 12B of fuse 12 and the conductive plates 80A and 80B to connect the fuse 12 with the busbar 6. In addition, the new fuse 12 being received in a recess 100 of the plastic overmoulded layer, the added thickness arising from a fuse replacement is limited, if not null, and does not impact the packaging.

Advantageously, there is one recess 100 for each fuse 8.

In a non-represented alternative embodiment, the plastic overmoulded layer 10 does not include any recess above the fuses 8 and additional conductive spacers are positioned between the conductive pads 12A and 12B of fuse 12 and the conductive plates 80A and 80B to connect the fuse 12 with the busbar 6.

In the example, the two parallel pins 81A and 81B of each fuse 8 fully protrude from the plastic overmoulded layer 10. However, in a non-represented alternative embodiment, the two parallel pins 81A and 81B of each fuse 8 may protrude only partially from the plastic overmoulded layer 10, meaning that one section of one or both parallel pins of each fuse may be encapsulated in the plastic overmoulded layer 10.

As shown on FIG. 5, the fuse box 2 includes optionally one, preferably two removable covers 18, respectively a top cover and a bottom cover, encasing the conductive part 4 and the plastic overmoulded layer 10, with the exception of the fused outputs 8B and of the connecting portions 6A and 6B of the busbar 6. The two covers 18 are for example clipped together using any suitable means. They form a protective casing that is pretty adapted in strong, aggressive and severe environments. Typically, such casing may protect from dust and liquid penetration.

When one fuse 8 is blown, there is no need to replace the whole fuse box because the blown fuse can easily be replaced by a new fuse. When the new fuse 12 is installed, it is not encapsulated in the plastic overmoulded layer 10. Typically, in order to replace a blown fuse, one must open the cover 18, unscrew wiring harness 14 connected to the fuse 8 which has blown-up, add and tighten a standalone standard bought fuse 12 above the fuse which has blown up inside the plastic material 10, close the cover 18.

Besides, in case the new standalone standard bought fuse 12 blows up, one should unscrew it, and replace it by a new standard fuse.

As shown on FIG. 5, the fuse box 2 is a fuse box module including at least one means for fitting another fuse box module 20. Typically, fuse box module 20 includes a busbar (not represented) including three connecting portions 20A, 20B and 20C. The connecting portions 20A and 20B are female electrical connectors since they are formed by rectangular plates delimiting a hole for receiving a connecting pin of a complementary male connector, such as the connecting pin 61B of the connector 6B formed at one end of the busbar 6. The connecting portion 20C is a male connector since it includes a connecting pin designed for entering a through hole delimited in a conductive pad of a complementary female connector belonging to another fuse module or for receiving a clamping screw analog to screws 12, in order to connect an electrical cable.

Fuse box module 20 also includes a fuse (not represented) connected to the busbar and forming a fused output 24. In the example, fused output 24 is a female connector, comprising a conductive plate with a through hole. However, in an alternative non-represented embodiment, the fused output 24 may also be configured as a male electrical connector.

When fuse box module 20 is fitted on fuse box module 2, modules 2 and 20 form together a fuse box assembly.

Figure 6:
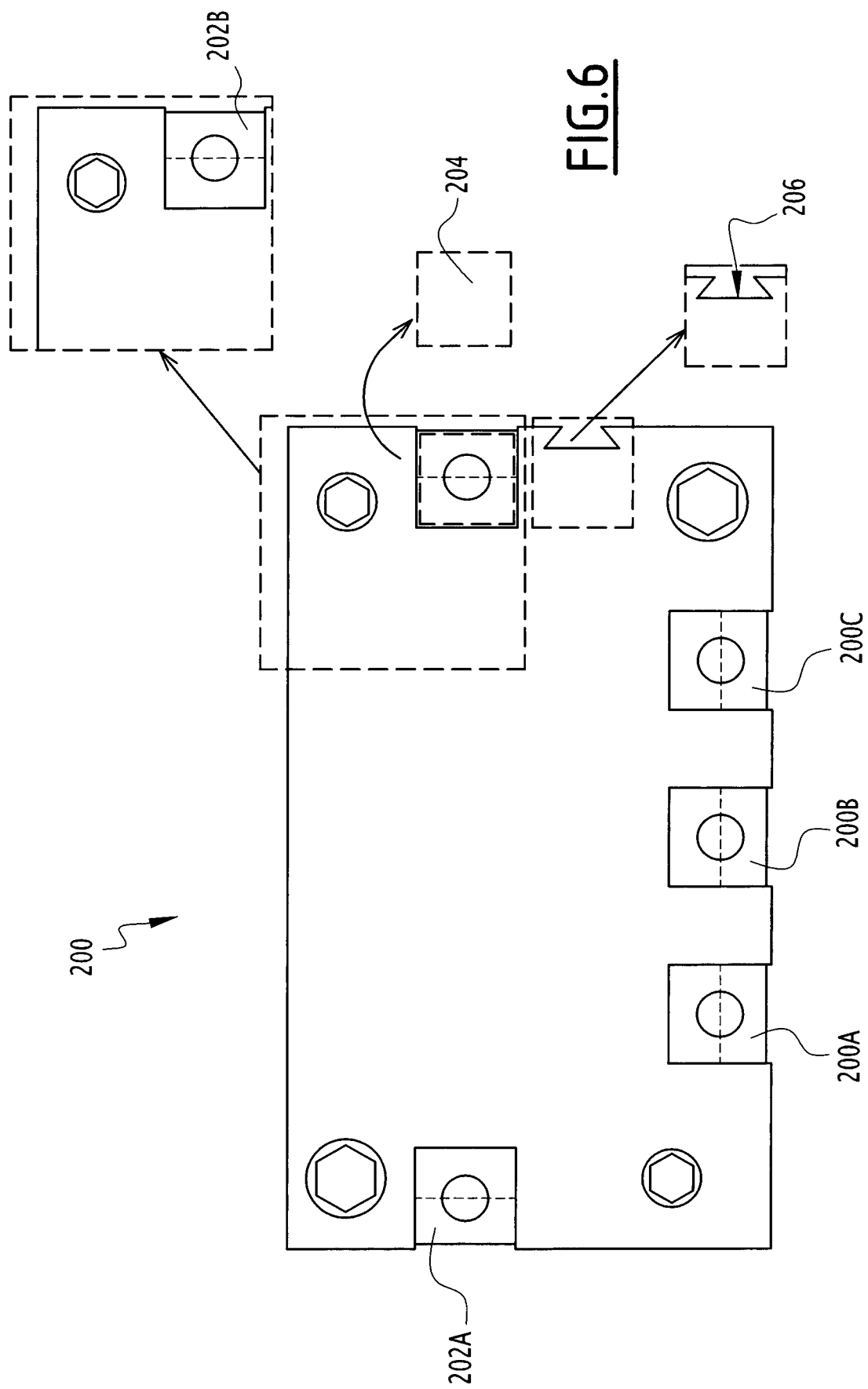
FIG. 6 is a scheme of a second embodiment of a fuse box according to the invention.

FIG. 6 represents a second embodiment of a fuse box 200 according to the invention. In the following, only the differences relative to the first embodiment are depicted for the purpose of conciseness.

Fuse box 200 includes a busbar with two connecting portions 202A and 202B and three fused outputs 200A, 200B and 200C. As in the embodiment of FIGS. 1 to 4, fused outputs 200A, 200B and 200C form male electrical connectors. Busbar and fuses are not visible on FIG. 6 because of a protective cover 18 but are identical to that of FIGS. 1 and 2. The connecting portions 202A and 202B may be male or female electrical connectors. Connecting portion 202B enables connecting a separate fuse box but is optional. In the example, the connecting portion 202B is covered with a protective cap 204 that is removable.

Figure 7:
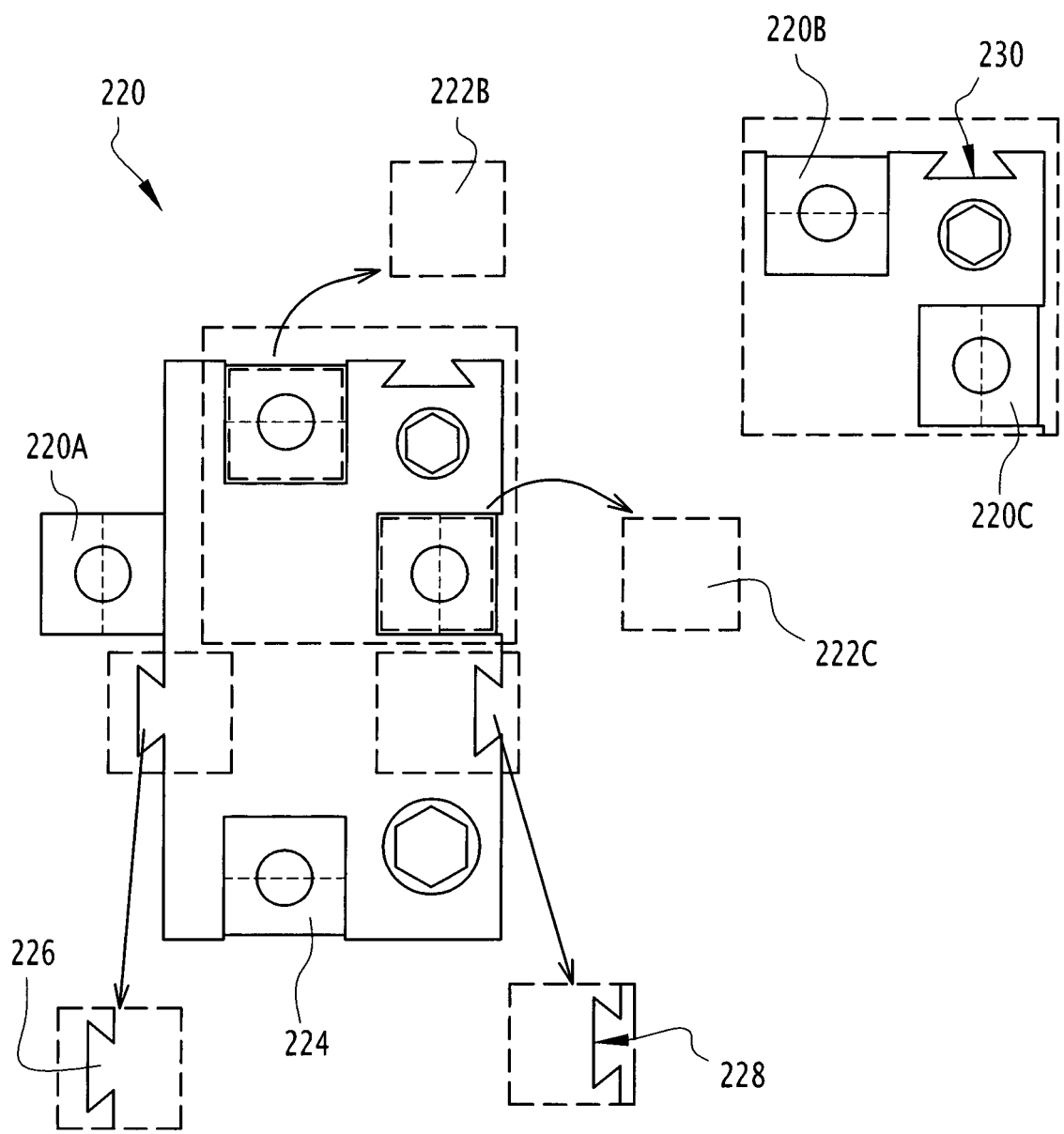
FIG. 7 is a scheme of a third embodiment of a fuse box according to the invention.

As in the embodiment of FIG. 5, fuse box 200 forms a fuse box module including at least one means 206 for fitting another fuse box module 220, represented on FIG. 7. Typically, the union between the fuse box modules 200 and 220 is obtained by a male-female fitting. Accordingly, means 206 is a female recess designed for receiving a complementary male element, i.e. a complementary male protusion.

As shown on FIG. 7, fuse box module 220 includes a busbar with three connecting portions 220A, 220B and 220C and only one fused output 224. As in the embodiment of FIGS. 1 to 4, the fused output 224 forms a male electrical connector. Busbar and fuse are not visible on FIG. 7 because of a protective cover 18 but the fuse is identical to that of FIGS. 1 and 2. As in the first embodiment, the busbar is also a straight bar but includes one more connecting portion, which is portion 220B. In the example, connecting portions 220B and 220C are preferably male electrical connectors, while connecting portion 220A is a female electrical connector. However, other arrangements can obviously be envisaged.

Fuse box module 220 includes a male protrusion 226 complementary to the recess 206 of fuse box module 200. Fuse box module 220 also includes one, preferably two female recesses 228 and 230 designed for receiving complementary male protrusions of other fuse box modules. Accordingly, fitting means 226, 228 and 230 form means for fitting two other fuse box modules. Typically, the three fitting means 226, 228 and 230 are arranged respectively on three different sides of the fuse box 220.

In the example, the connecting portions 220B and 220C are covered with protective caps, respectively 222B and 222C, that are both removable.

Figure 8:
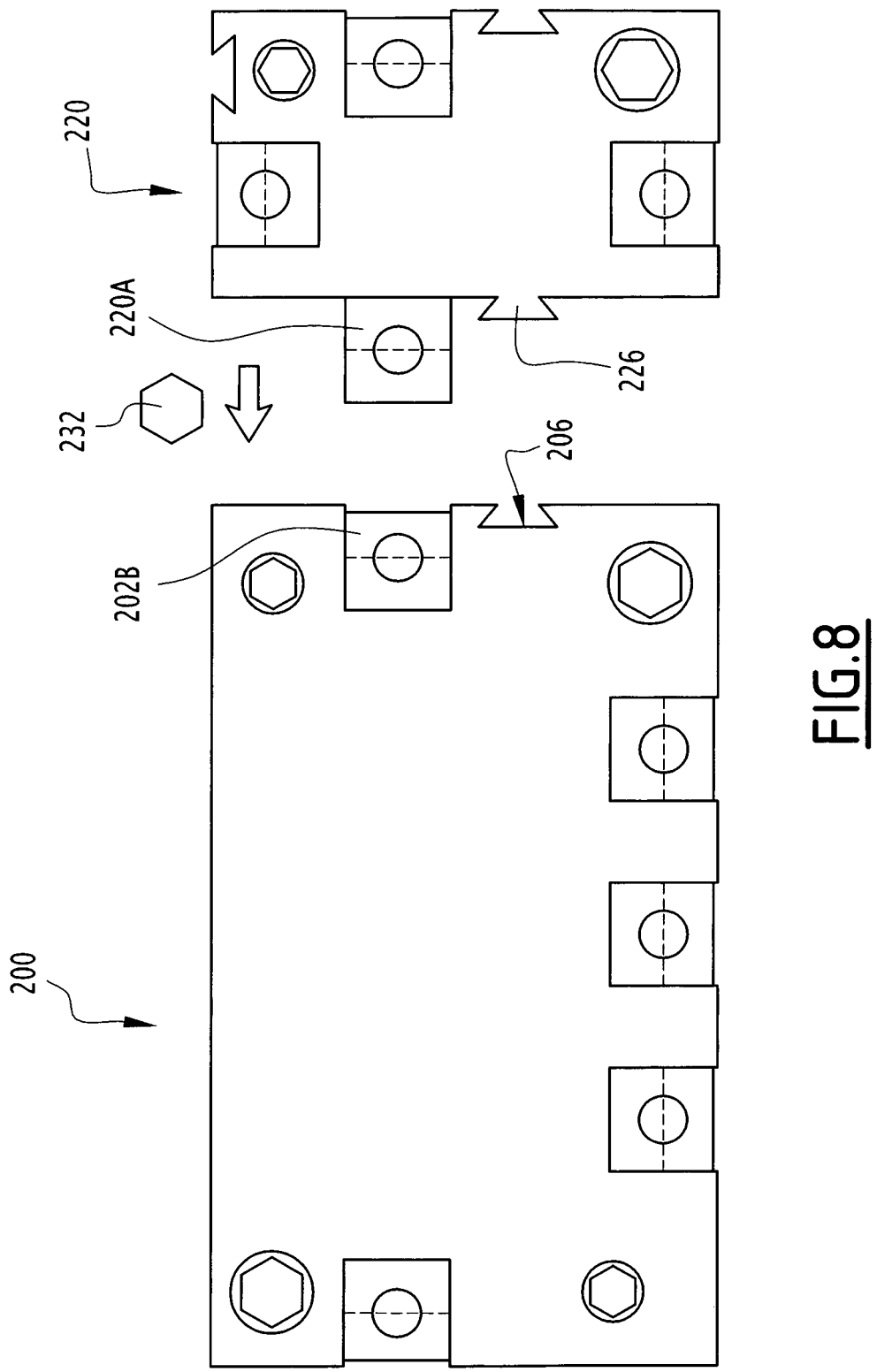
FIGS. 8 and 9 are schemes representing an assembly comprising a fuse box module according to the second embodiment of the invention and a fuse box module according to the third embodiment of the invention.
Figure 9:
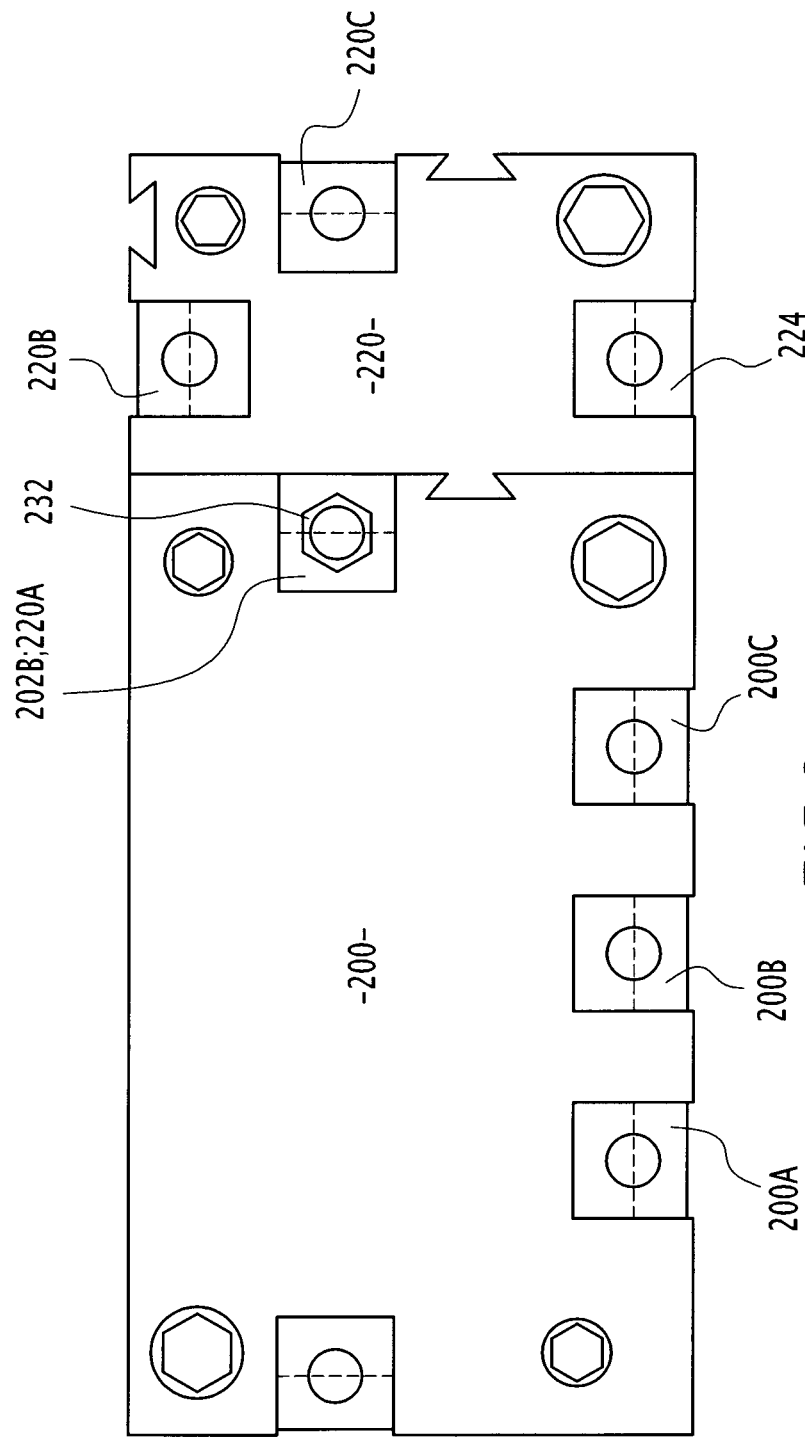

FIGS. 8 and 9 show the union between the fuse box modules 200 and 220. In particular, the protrusion 226 of the fuse box module 220 is received in the recess 206 of the fuse box module 200 and the connecting portion 202B of module 100 is connected to the connecting portion 220A of the fuse box module 220. Accordingly, the respective busbars of the fuse box modules 200 and 220 are electrically connected together.

Advantageously, a nut 232 is used to secure the connection between the connecting portions 202B and 220A.

Figure 10:
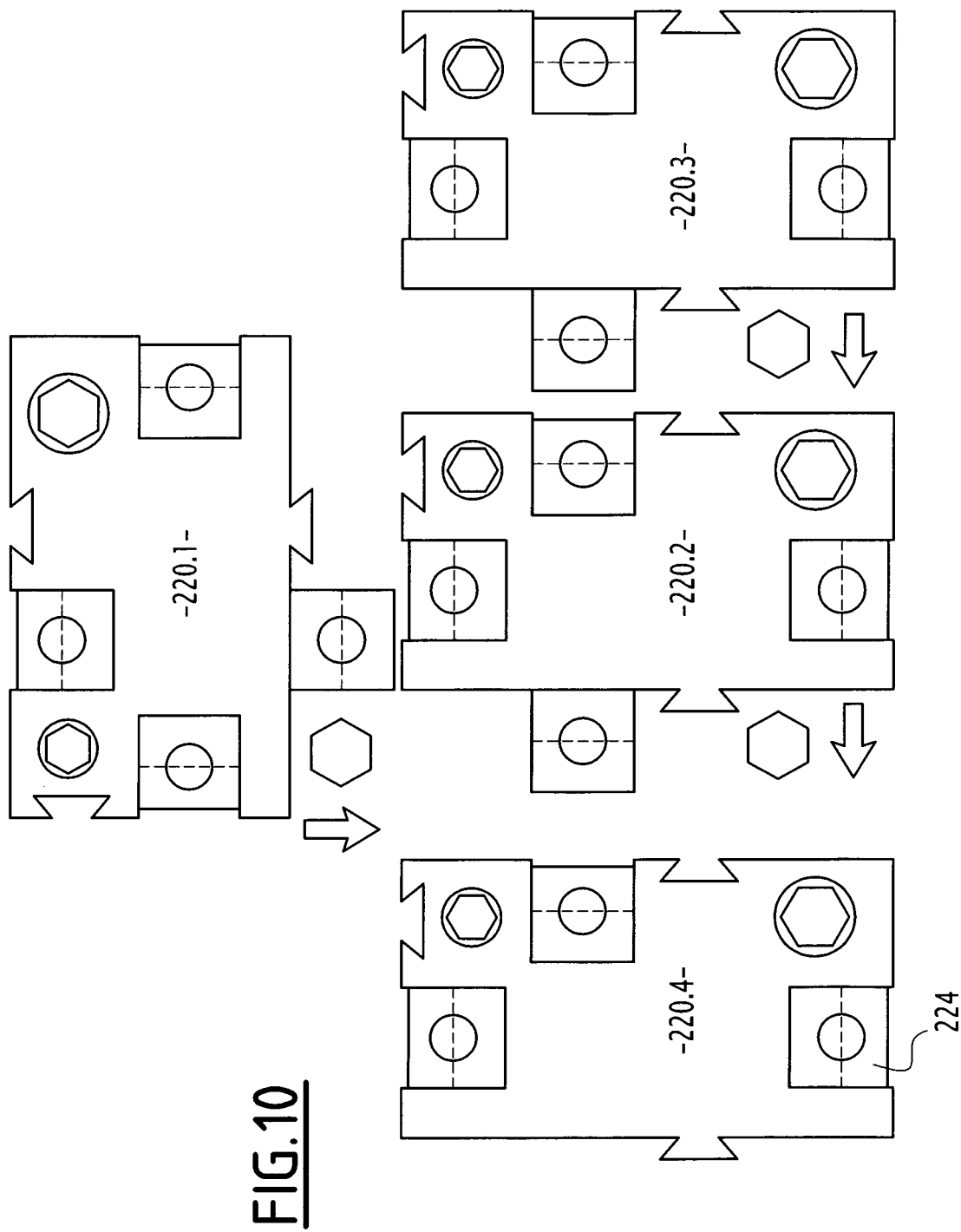
FIGS. 10 and 11 are schemes representing an assembly of four fuse box modules according to the third embodiment of the invention, namely in a disassembled and an assembled configuration.
Figure 11:
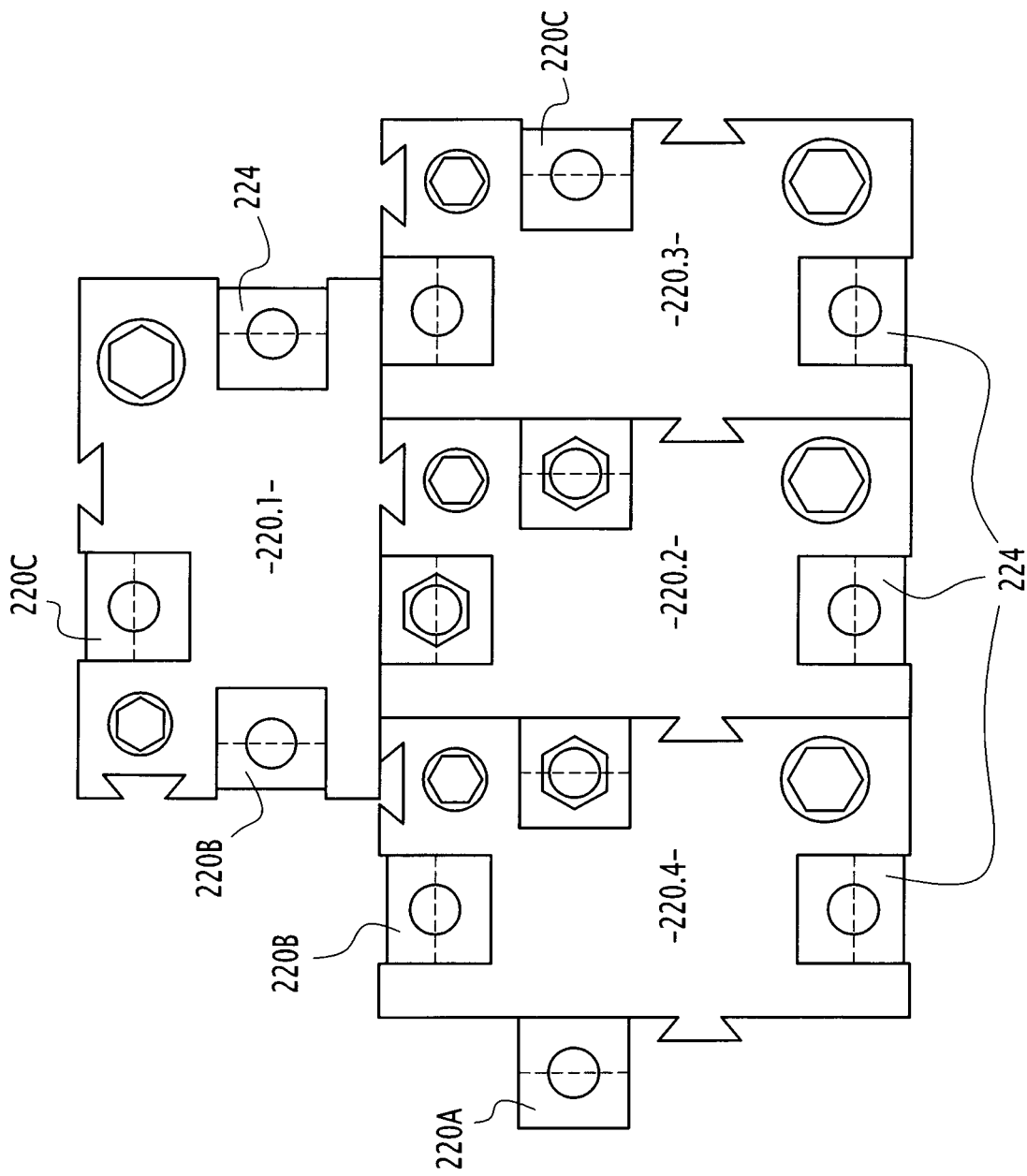

FIGS. 10 and 11 show a fuse box assembly, comprising four fuse box modules 220.1, 220.2, 220.3 and 220.4 that are each identical to the fuse box module of FIG. 7. As in the embodiment of FIGS. 8 and 9, the union between the fuse box modules 220.1, 220.2, 220.3 and 220.4 is obtained by male-female fittings. In the example, fuse box module 220.1 is connected to fuse box module 220.2, which is itself connected to fuse box modules 220.3 and 220.4. In particular, fuse box module 220.2 is arranged between fuse box modules 220.3 and 220.4.

On the drawings, each embodiment of the fuse box includes only one busbar. However, in a non-represented alternative embodiment, the fuse box may include several busbars (or "bus bars").

In another non-represented alternative embodiment, some fixations means (holes and/or inserts) can be inserted during injection so as to create fuse box fixations points.

In another non-represented alternative embodiment, plastic material injection can be designed in order to create directly the final shape of the fuse box 2. This means that the fuse box does not include any additional housing or cover.

In another non-represented alternative embodiment, the parts of the fuse box that are not encapsulated in the plastic overmoulded layer 10 may be protected by removable covers or caps, preferably made of electrically insulating material.

In another non-represented alternative embodiment, the plastic overmoulded layer or matrix 10 includes separation walls between each fused outputs 8B. These separation walls prevent short circuits (electrical arcing) between the different fused outputs 8B. Separation walls extend parallel to the longitudinal direction of the fuse(s) 8, which is perpendicular to the busbar 6.

Also, in another non-represented alternative embodiment, the plastic overmoulded layer or matrix 10 includes longitudinal ducts on each side of the fuse(s) 8 so as to drain any liquid in the event of a contamination. Longitudinal ducts extend parallel to the longitudinal direction of the fuse(s) 8, which is perpendicular to the busbar 6, and provide good liquid drainage.

In another non-represented alternative embodiment, fuses may extend on each side of the busbar 6.

The features of the described embodiments and non-represented alternative embodiments may be combined together so as to generate new embodiments of the invention.

The invention claimed is:

1. A fuse box, comprising a busbar and at least one fuse connected to the busbar, each fuse of the at least one fuse including two opposite end portions and a central portion, at least the central portion of each fuse of the at least one fuse and a section of the busbar being encapsulated in a plastic coating layer, the central portion includes a part of reduced cross-section, the two opposite end portions include two respective electrical connectors, at least the two electrical connectors of each fuse of the at least one fuse are not encapsulated in the plastic coating layer, and the opposite end portions of each fuse of the at least one fuse include coplanar conductive plates and the central portion is offset from a geometric plane extending between the conductive plates of the fuse.

2. The fuse box according to claim 1, characterized in that said at least two electrical connectors are two connecting pins that extend in parallel to each other.

3. The fuse box according to claim 2, characterized in that the parallel connecting pins of each fuse of the at least one fuse extend in a direction that is perpendicular to a surface of a sheet of conductive material of the busbar.

4. The fuse box according to claim 2, characterized in that each connecting pin fully protrudes from the plastic coating layer.

5. The fuse box according to claim 2, wherein the opposite end portions of each fuse of the at least one fuse include two respective parallel conductive plates, wherein the parallel connecting pins extend from the conductive plates in a direction that is perpendicular to the conductive plates, wherein the conductive plates are encapsulated in the plastic coating layer and wherein the parallel connecting pins are not encapsulated in the plastic coating layer.

6. The fuse box according to claim 1, characterized in that the busbar and each fuse of the at least one fuse are manufactured from a single sheet of conductive material, in particular from a steel sheet.

7. The fuse box according to claim 1, characterized in that the plastic coating layer includes a recess for receiving a new fuse above a blown fuse.

8. The fuse box according to claim 1, characterized in that the at least one fuse includes several fuses.

9. The fuse box according to claim 1, characterized in that the fuse box includes only one new fuse.

10. The fuse box according to claim 1, characterized in that each fuse of the at least one fuse extends perpendicular from the busbar.

11. The fuse box according to claim 1, comprising only one busbar.

12. The fuse box according to claim 1, characterized in that the busbar includes at least one connecting portion.

13. The fuse box according to claim 12, characterized in that each connecting portion includes a connecting pin or a connecting hole.

14. The fuse box according to claim 12, characterized in that each connecting portion is not encapsulated in the plastic coating layer.

15. The fuse box according to claim 1, characterized in that the busbar includes three connecting portions.

16. The fuse box according to claim 1, characterized in that the opposite end portions of each fuse of the at least one fuse are not encapsulated in the plastic coating layer.

17. The fuse box according to claim 1, characterized in that the plastic coating layer is a plastic overmoulded layer.

18. The fuse box according to claim 1, characterized in that the fuse box is a fuse box module of a fuse box assembly and includes at least one means for fitting another fuse box module.

19. A fuse box assembly, comprising at least two fuse box modules to be fitted together, characterized in that at least one of the fuse box modules comprises the fuse box of claim 1.

20. The fuse box assembly according to claim 19, characterized in that a union between the fuse box modules is obtained by a male-female fitting.

21. A vehicle, comprising the fuse box according to claim 1.

22. A fuse box, comprising a busbar and at least one fuse connected to the busbar, each fuse of the at least one fuse including two opposite end portions and a central portion, at least the central portion of each fuse of the at least one fuse and a section of the busbar being encapsulated in a plastic coating layer, the central portion includes a part of reduced cross-section, the two opposite end portions include two respective electrical connectors, said at least two electrical connectors are two connecting pins that extend in parallel to each other and are not encapsulated in the plastic coating layer, the opposite end portions of each fuse of the at least one fuse include two respective parallel conductive plates, wherein the connecting pins extend from the conductive plates in a direction that is perpendicular to the conductive plates, wherein the conductive plates are encapsulated in the plastic coating layer.

* * * * *